United States Patent
Li

(10) Patent No.: US 9,434,466 B2
(45) Date of Patent: Sep. 6, 2016

(54) COMPONENT HAVING A BOX STRUCTURE FOR AN AIRPLANE AIRFOIL

(75) Inventor: Jun Li, Beijing (CN)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 14/361,453

(22) PCT Filed: Nov. 30, 2011

(86) PCT No.: PCT/CN2011/083253
§ 371 (c)(1),
(2), (4) Date: May 29, 2014

(87) PCT Pub. No.: WO2013/078649
PCT Pub. Date: Jun. 6, 2013

(65) Prior Publication Data
US 2014/0284424 A1    Sep. 25, 2014

(51) Int. Cl.
| | | |
|---|---|---|
| B64C 1/00 | (2006.01) |
| B64C 3/00 | (2006.01) |
| B64C 5/00 | (2006.01) |
| B64C 3/18 | (2006.01) |
| B64C 3/26 | (2006.01) |

(52) U.S. Cl.
CPC ............... B64C 3/18 (2013.01); B64C 3/185 (2013.01); B64C 3/26 (2013.01)

(58) Field of Classification Search
CPC .......... B64C 3/18; B64C 3/185; B64C 3/22; B64C 3/26; B64C 3/28; B64C 5/00; B64C 5/02; B64C 5/04; B64C 5/06; B64C 5/08; B64C 7/00

USPC ....... 244/123.1, 123.14, 123.2, 123.3, 123.7, 244/123.8, 123.9, 124
See application file for complete search history.

(56) References Cited

U.S. PATENT DOCUMENTS

| | | | |
|---|---|---|---|
| 2,613,893 A | | 10/1952 | Young |
| 3,093,219 A | * | 6/1963 | Ramme .................... B64C 3/24 138/117 |

(Continued)

FOREIGN PATENT DOCUMENTS

| | | |
|---|---|---|
| CN | 201472665 U | 5/2010 |
| CN | 101758923 A | 6/2010 |
| EP | 2 050 669 A2 | 4/2009 |

(Continued)

OTHER PUBLICATIONS

International Search Report mailed May 17, 2012 in International Application No. PCT/CN2011/083253, filed Nov. 30, 2011.

(Continued)

*Primary Examiner* — Christopher P Ellis
*Assistant Examiner* — Richard G Davis
(74) *Attorney, Agent, or Firm* — Hauptman Ham, LLP

(57) ABSTRACT

The present invention relates to a panel, especially for a component having a box structure in an airplane airfoil, comprising a surface shaped body and grid-like reinforcement bars protruding from the body on one side of the body, and the body and the grid-like reinforcement bars are integral molded. Since the body and the grid-like reinforcement bars of the panel are integral molded, no additional connecting process is required, so that the disconnection phenomenon as happened between the skin and the stiffener or stringer of the prior art would not occur, and the assembly complexity can be decreased.

8 Claims, 1 Drawing Sheet

(56) References Cited

U.S. PATENT DOCUMENTS

2009/0159742 A1  6/2009  Ramirez Blanco et al.
2010/0140405 A1  6/2010  Capasso et al.

FOREIGN PATENT DOCUMENTS

| EP | 2196309 A1 | 6/2010 |
| GB | 132026 A | 9/1919 |
| GB | 156352 A | 1/1921 |
| GB | 162918 A | 5/1921 |
| GB | 313148 A | 1/1930 |

OTHER PUBLICATIONS

Written Opinion mailed May 17, 2012 in International Application No. PCT/CN2011/083253, filed Nov. 30, 2011.
EP Search Report dated Jul. 8, 2015 issued in EP Application No. 11876808.

* cited by examiner

COMPONENT HAVING A BOX STRUCTURE FOR AN AIRPLANE AIRFOIL

RELATED APPLICATIONS

The present application is a National Phase of International Application Number PCT/CN2011/083253, filed, Nov. 30, 2011.

FIELD OF THE INVENTION

The present invention relates to a component having a box structure for an airplane airfoil, especially a wing, a flap, an aileron, a slat, an empennage or the constitution parts thereof, and so on.

BACKGROUND OF THE INVENTION

An airplane airfoil generally consists of a frame and a skin. The frame may comprise a plurality of spars, ribs (optional) and stringers (optional). The frame and the skin of the airfoil form a box structure. Since the frame comprises large quantities of spars, ribs and stringers, the structure of the frame is complex.

During the manufacture of such components having a box structure for an airplane airfoil (e.g. a wing, a flap, an aileron, a slat, an empennage or the constitution parts thereof), the connection of the skin and the spars is complex and time-consuming. In the prior art, the connection of the skin and the spars is generally achieved by means of bonding or fasteners (such as rivets).

If the connection is achieved by means of bonding, firstly, it will be necessary to position the skin and the spars; then a plurality of clamps are installed to tightly clamp the positioned skin and spars, so as to guarantee no relative displacement occurs during the connection of the skin and the spars. However, due to the large quantities of the spars, large quantities of the clamps are needed for installation, which makes the installation process very time-consuming.

If the connection is achieved by means of rivets, the positioning between the skin, which has a curved shape, and the spars is difficult though no large quantities of the clamps are needed. Moreover, when the skin covers on the frame to form a closed box structure, it is necessary for the installation personnel to enter inside of the closed box structure to prosecute the riveting operation, which further makes the manufacture difficult.

Especially in the components having a box structure which has a small inner space (such as a flap trailing edge), in the case that honeycomb fills are filled or ribs are arranged therein, the connection of the skin and the spars are even more harder due to the small inner space of the components having a box structure.

SUMMARY OF THE INVENTION

The present invention is based on the object of providing a component having a box structure for an airplane airfoil (in particular, a wing, a flap, an aileron and so on), which has a simple structure and is easily manufactured.

In order to achieve the object of the invention, a component having a box structure for an airplane airfoil, in particular, a wing, a flap or an aileron and so on, is provided, which comprises a plurality of C-profiles, the plurality of C-profiles being subsequently inserted into one another, wherein one of the C-profiles with its connecting portion is inserted into an opening end of another adjacent one of the C-profile and is fixed thereto in the region of being inserted into one another. Since all the C-profiles can be subsequently inserted into and fixed to one another through fasteners, it is not necessary for the installation personnel to enter inside of the closed box structure for installation, which makes the manufacture of the component simple. Moreover, compared with the traditional component for an airfoil which consists of a frame and a skin, the structure of the component for an airfoil according to the disclosure is simpler, and can be made merely through the inserting of all the C-profiles. Thus, it is not necessary to separately manufacture the frame and the skin.

Preferably, when viewed from the opening end to the closure end of the component, a first C-profile is completely inserted into an opening end of a second C-profile. Therefore, the first C-profile forms a front spar of the component.

Preferably, when viewed from the opening end to the closure end of the component, except the first C-profile, one of the other C-profiles is partly inserted into an opening end of another adjacent one of the other C-profiles.

Preferably, a step is provided on either of the two legs of the C-profiles, which is used as a positioning stop when inserting into another C-profile. This simplifies the relative positioning of the C-profiles.

Preferably, the legs of the C-profiles form a skin of the component (in particular, a wing, a flap or an aileron), thus there is no need to arrange a separate skin. This not only simplifies the structure of the component, but also leaves out the complex positioning between the skin, which has a curved shape, and the spars, so as to further simplify the manufacturing process.

According to the curved shape of the component which is conformed to the aerodynamics, the surface shape of the legs of the C-profiles is respectively designed, and the curved shape of a desired skin is formed through the combination of the legs of the C-profiles. Therefore, the curved shape of the skin can be made in a simple manner.

The connecting portions of the C-profiles are configured as spars of the component having a box structure for an airplane airfoil, in particular, a wing, a flap or an aileron. Therefore, the size of the C-profiles can be designed according to the specific condition of being subject to the load, so as to achieve an optimum capability of being subject to the load. The component having a box structure for an airplane airfoil according to the disclosure is especially suitable for the component having a box structure which has a small inner space (such as a flap trailing edge), because in the inner space of these components, it is not necessary for the honeycomb fills to be filled therein or ribs to be arranged therein. Preferably, when viewed from the opening end to the closure end of the component, the last C-profile is made of metal, or the connecting portion of the last C-profile is covered by a metal layer. This is advantages for a wing, a flap, an aileron, a slat, an empennage or the constitution parts thereof, because the end member containing metal can be used to defend the lightening.

Preferably, two adjacent C-profiles are fixed to one another through fasteners, e.g. rivets. This can achieve the quick and convenient connection of the C-profiles.

BRIEF DESCRIPTION OF THE DRAWINGS

Embodiments of the invention will be explained in detail below with reference to the drawings, in which.

DETAILED DESCRIPTION OF THE DRAWINGS

Hereinbelow, the component having a box structure according to the disclosure is described through a flap trailing edge for an airplane airfoil as a preferred embodying form. It should be noticed that the flap trailing edge is merely exemplary, and the following described embodying form does not limit the invention. The component having a box structure for an airplane airfoil according to the disclosure can be a wing, a flap, an aileron, a slat, an empennage or the constitution parts thereof and so on.

Figure 1:
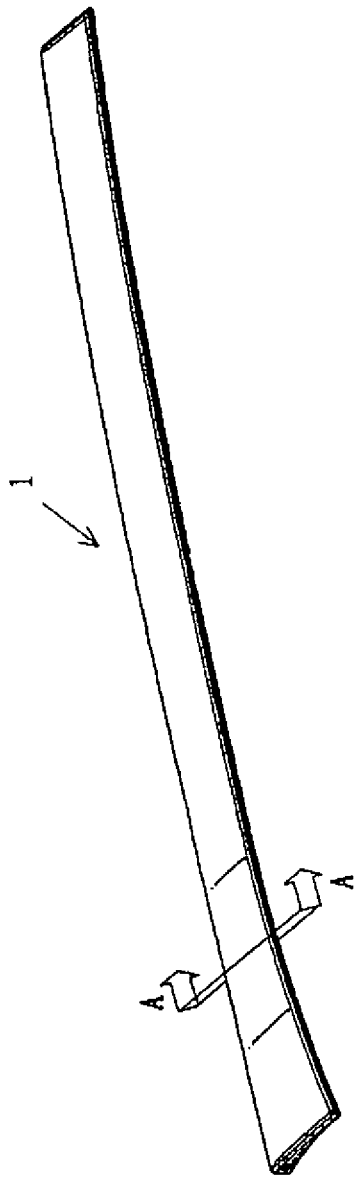
FIG. 1 shows a schematic view of a flap trailing edge of an airplane airfoil.

Referring to FIG. 1, a flap trailing edge 1 comprises an upper skin, a lower skin, a front spar and a closure end. The upper skin and the lower skin respectively cover on the top and bottom of the front spar and the closure end, so as to form a box structure.

Figure 2:
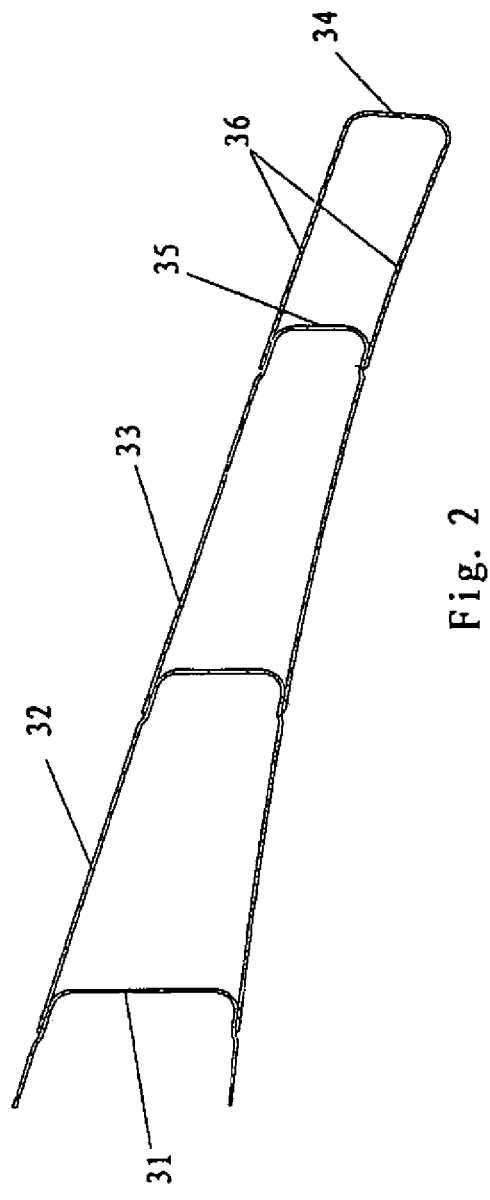
FIG. 2 shows a cross-sectional view of the component having a box structure for an airplane airfoil according to an embodiment of the invention along line A-A of FIG. 1.

FIG. 2 shows a cross-sectional view of the component having a box structure for an airplane airfoil (i.e. a flap trailing edge 1) according to an embodiment of the invention along line A-A of FIG. 1. In the embodiment shown in FIG. 2, the component having a box structure for an airplane airfoil comprises four C-profiles, wherein a first C-profile 31 herein as a front bar is completely inserted into an opening end of a second C-profile 32, and is fixed thereto in the region of being inserted into one another through fasteners, e.g. rivets. The second C-profile 32 with its connecting portion is partly inserted into an opening end of a third C-profile 33, and is fixed thereto in the region of being inserted into one another through fasteners e.g. rivets. Likely, the third C-profile 33 with its connecting portion is partly inserted into an opening end of a fourth C-profile 34, and is fixed thereto in the region of being inserted into one another through fasteners e.g. rivets. In addition, the four C-profiles can be connected with one another through other manners (such as bonding). The connecting portion of the fourth C-profile herein is configured as a closure end. In this embodiment, the four C-profiles inserted into one another form a component having a box structure. It should be noted that, the number of the C-profiles in this embodiment is exemplary. The number of the C-profiles can be chosen according to the size of the component and the specific condition of being subject to the load. Since all the C-profiles can be subsequently inserted and fixed into one another through fasteners, it is not necessary for the installation personnel to enter inside of the closed box structure for installation, which makes the manufacture of the component simple.

In order to facilitate the relative positioning of the C-profiles, a step is provided on either of the two legs 36 of the C-profiles, which is used as a positioning stop when inserting into another C-profile. This simplifies the relative positioning of the C-profiles.

In this embodiment, the legs 36 of the C-profiles form a skin of the component (in particular, a wing, a flap or an aileron) for an airplane airfoil, thus there is no need to arrange a separate skin. This not only simplifies the structure of the component, but also leaves out the complex positioning between the skin, which has a curved shape, and the spars, so as to further simplify the manufacturing process.

According to the curved shape of the component which is conformed to the aerodynamics, the surface shape of the legs of the C-profiles is respectively designed, and the curved shape of a wantded skin being conformed to the aerodynamics is formed through the combination of the legs of the C-profiles. Therefore, the curved shape of the skin can be made in a simple manner.

The connecting portions 35 of the C-profiles are configured as spars of the component having a box structure for an airplane airfoil, in particular, a wing, a flap or an aileron. Therefore, the size of the C-profiles can be designed according to the specific condition of being subject to the load, so as to achieve an optimum capability of being subject to the load. The component having a box structure for an airplane airfoil according to the disclosure is especially suitable for the component having a box structure which has a small inner space (such as a flap trailing edge), because in the inner space of these components, it is not necessary for the honeycomb fills to be filled therein or ribs to be arranged therein.

The C-profiles can be made of composite material. The composite material may be for example Carbon Fiber Reinforcement Plastic (CFRP), with the matrix being epoxy resin, bismaleimide resin, thermosetting resin, or thermoplastic resin and so on. In this embodiment, the fourth C-profile can be made of metal. Alternatively, the connecting portion of the fourth C-profile (which is configured as a closure end of the component) is covered by a metal layer.

Although the invention has been described by way of example and with reference to particular embodiments it is to be understood that modification and/or improvements may be made without departing from the scope of the appended claims. This is advantages for a wing, a flap, an aileron, a slat, an empennage or the constitution parts thereof, because the end member containing metal can be used to defend the lightening.

Where in the foregoing description reference has been made to integers or elements having known equivalents, then such equivalents are herein incorporated as if individually set forth. This is advantages for a wing, a flap, an aileron, a slat, an empennage or the constitution parts thereof (such as a flap trailing edge), because the end member containing metal can be used to prevent from lightening.

LIST OF REFERENCE NUMERALS 1 flap trailing edge
31 a first C-profile
32 a second C-profile
33 a third C-profile
34 a fourth C-profile
35 a connecting portion of a C-profile
36 a leg of a C-profile

The invention claimed is:

1. A component having a box structure for an airplane airfoil, comprising a plurality of C-profiles, the plurality of C-profiles each consist of a connecting portion, two legs and an opening end, wherein the connecting portion is opposite to the opening end, and the two legs respectively extend from the connecting portion to the opening end, the plurality of C-profiles being subsequently inserted into one another, wherein one of the C-profiles with its connecting portion is inserted into an opening end of another adjacent one of the C-profile and is fixed thereto in the region of being inserted into one another.

2. A component according to claim 1, wherein a step is provided on either of the two legs of the C-profiles, which is used as a positioning stop when inserting into another C-profile.

3. A component according to claim 1, wherein the legs of the C-profiles form a skin of the component.

4. A component according to claim 1, wherein a surface shape of the legs of the C-profiles is respectively designed as a curved shape which is conformed to the aerodynamics.

5. A component according to claim 1, wherein the connecting portions of the C-profiles are configured as spars of the component having a box structure for an airplane airfoil.

6. A component according to claim 1, wherein when viewed from the opening end to the closure end of the component, the last C-profile is made of metal.

7. A component according to claim 1, wherein when viewed from the opening end to the closure end of the component, the connecting portion of the last C-profile is covered by metal.

8. A component according to claim 1, wherein two adjacent C-profiles are fixed to one another through fasteners, e.g. rivets.

* * * * *